(12) United States Patent
Su

(10) Patent No.: US 6,633,341 B2
(45) Date of Patent: Oct. 14, 2003

(54) LUMINANCE CORRECTION SYSTEM USED IN A VISION SYSTEM

(75) Inventor: Jimmy Su, Taipei Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 407 days.

(21) Appl. No.: 09/760,185

(22) Filed: Jan. 12, 2001

(65) Prior Publication Data
US 2002/0051086 A1 May 2, 2002

(30) Foreign Application Priority Data
Oct. 27, 2000 (TW) ........................... 89122659 A

(51) Int. Cl.$^7$ ............................ H04N 5/58; H04N 9/64
(52) U.S. Cl. ..................... 348/602; 348/603; 348/687; 348/658; 358/520
(58) Field of Search ........................ 348/602, 603, 348/649, 645, 646, 655, 656, 708, 687, 690, 650, 651, 658, 673, 679, 703; 382/167; 358/518, 520, 523; H04N 5/58, 9/64

(56) References Cited

U.S. PATENT DOCUMENTS 4,547,797 A * 10/1985 Mick ........................... 348/655
6,373,531 B1 * 4/2002 Hidaka et al. ............... 348/603

* cited by examiner

Primary Examiner—Sherrie Hsia
(74) Attorney, Agent, or Firm—J. C. Patents

(57) ABSTRACT

An intelligent luminance correction system is used in a vision system. The vision system has a video decoder, used to receive a video signal and decode the video signal into three basic components of red, green, and blue. A photodetector is used to detect the luminance of the current environment, so as to export a reference signal. A color correction circuit is used to receive the reference signal and the three component of RGB. The color correction circuit also stores a vision response curve at dark condition and a vision response curve at bright condition, so that the color correction circuit can determine one curve of the vision response curve at dark condition and a vision response curve at bright condition according to environment luminance indicated by the reference signal. The three components of RGB thereby are corrected individual. After correction, the color correction circuit exports the corrected three components of RGB to a display.

15 Claims, 3 Drawing Sheets

LUMINANCE CORRECTION SYSTEM USED IN A VISION SYSTEM

CROSS-REFERENCE TO RELATED APPLICATION

This application claims the priority benefit of Taiwan application Ser. No. 89122659, filed Oct. 27, 2000.

BACKGROUND OF THE INVENTION

1. Field of Invention

The present invention relates to a vision system. More particularly, the present invention relates to a luminance correction system of image used in an imaging device.

2. Description of Related Art

Displaying appliance is widely used in our daily life. Particularly, a TV set or a computer system always need a displaying appliance, so that an image can be displayed on the screen of the displaying appliance, and thereby a user can see the image on the displaying device. Moreover, the displaying appliance can also be a projecting type, which can project an image onto a screen.

However, no matter which type of the displaying appliance, the displayed image always needs to be sense by the user's vision organ, so as to recognize the content of the image. In this situation, the luminance of the environment can affect the vision effect for the user. Particularly, our eyes have different responses for the color in frequency at different degrees of luminance. Usually, a light can be de-coupled into three components of red, green, and blue. This allows the color correction can be corrected by the three components of red, green, and blue, respectively. FIG. 4 is a drawing, showing the eye's response with respect to frequency range of visible color under a bright and dark environment, according to the data provided by Commission Internationale De L'eclairage (CIE). In FIG. 4, the solid curve represents the vision response curve under a bright environment, while the dashed curve represents the vision response curve under a dark environment. The horizontal axis is the quantity of light wavelength, the vertical axis represent the relative response. The red light has a wavelength of about 700 nm, the green light has a wavelength of about 550 nm, and the blue light has a wavelength of about 480 nm. As shown in FIG. 4, the response for different environment luminance is clearly different.

As depicted above, the displaying appliance under different environment luminance, the displaying appliance needs different degrees of luminance contrast ratio (CR) and variance of color saturation. The conventional method to correct the color luminance needs to be adjusted by the user through a software and an electrical feedback circuit. FIG. 1 is a diagram, schematically illustrating a conventional control system on a LCD displaying system. In FIG. 1, the LCD displaying system has a luminance control circuit 100. An LCD 110 is coupled to the luminance control circuit 100. The luminance control circuit 100 also coupled to a central process unit (CPU) 102 and other peripheral devices 104 through a system data bus. The luminance of the LCD 110 is controlled by the luminance control circuit 100. A photodetector 108 can detect the luminance of the environment, so as to determine the luminance of the LCD 110. User can adjust the luminance of the LCD 110 by the control button 106, according to the user's preference. In this conventional skill, the color components of luminance of the LCD are adjusted at the same time. There is no individual consideration with respect to different colors under different luminance. Moreover, the result of luminance is still needing an adjustment through the control button 106 by the user. One of the drawbacks in this conventional method is that the eye response for different color under different environment luminance cannot be properly included in adjustment.

In the conventional skills, another method is proposed to correct color through the three components of red, green, and green (RGB). FIG. 2 is a drawing, schematically illustrating a color control system on a TV cathode-ray tube through a color temperature. In FIG. 2, the color control system includes a color decoder 112, used to decode a video signal into three components of RGB. The three color components of RGB are inputted into amplifiers 114a, 114b and 114c associating with nonlinear amplifications of red signal, green signal, and blue signal, respectively. Since the color temperature of the cathode-ray tube (CRT) 118 usually affects the color intensity of the each individual color. When the inputs of the red and green signals are greater than a predetermined value with respect to white color, the amplifications are adjusted to compensate the effect from the color temperature. However, the blue light remains without change. Then, three color signals of RGB are inputted to a video processing circuit 116 and then inputted to the CRT 118. In this conventional skill, it uses the three color components to adjust the color temperature of the CRT. However, this conventional skill can only be used in the control of CRT. It also cannot effectively adjust individual response for different colors.

SUMMARY OF THE INVENTION

The invention provides an intelligent luminance correction system used in a vision system. The invention can individually compensate luminance of the three basic color components of RGB for visual response under different environment luminance. There invention can automatically adjust the brightness of each color component without hand operation by user.

The invention provides an intelligent luminance correction system used in a vision system. The vision system includes a video decoder, used to receive a video signal and decode the video signal into three basic components of red, green, and blue. A photodetector is used to detect the luminance of the current environment, so as to export a reference signal. A color correction circuit is used to receive the reference signal and the three components of RGB. The color correction circuit also stores a vision response curve at dark condition and a vision response curve at bright condition, so that the color correction circuit can determine one curve of the vision response curve at dark condition and a vision response curve at bright condition according to environment luminance indicated by the reference signal. The three components of RGB thereby are corrected individual. After correction, the color correction circuit exports the corrected three components of RGB to a display.

In the foregoing, the invention can also be used in a projection device.

In the foregoing, the color correction circuit can further include a control software to individually compensate the three color components.

In the foregoing, the vision response curve at dark condition and the vision response curve at bright condition are taken according to the organization of CIE.

The invention also provides a method for adjusting image luminance. The method includes providing a video signal having three components of red, green, and blue. The method also includes detecting an environment luminance and accordingly generating a reference signal. A vision response curve at bright condition and a vision response curve at dark condition are provided. According to the reference signal, one of the vision response curve at bright condition and a vision response curve at dark condition is then chosen as a correcting vision response curve. The correcting vision response curve is used to individually correct the three components of red, green, and blue. A display is provided, and receives the three components of red, green, and blue for displaying the video signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Features of the invention includes using a photodetector to detect the degree of environment luminance. Then, according to the detected result of the environment luminance, a vision response curve is chosen and is used to automatically correct the luminance with respect to three basic color components of red, green, and blue (RGB). As a result, the image displayed on the screen can be maintained at the optimized status, without be biased due to personal difference of user.

Figure 1:
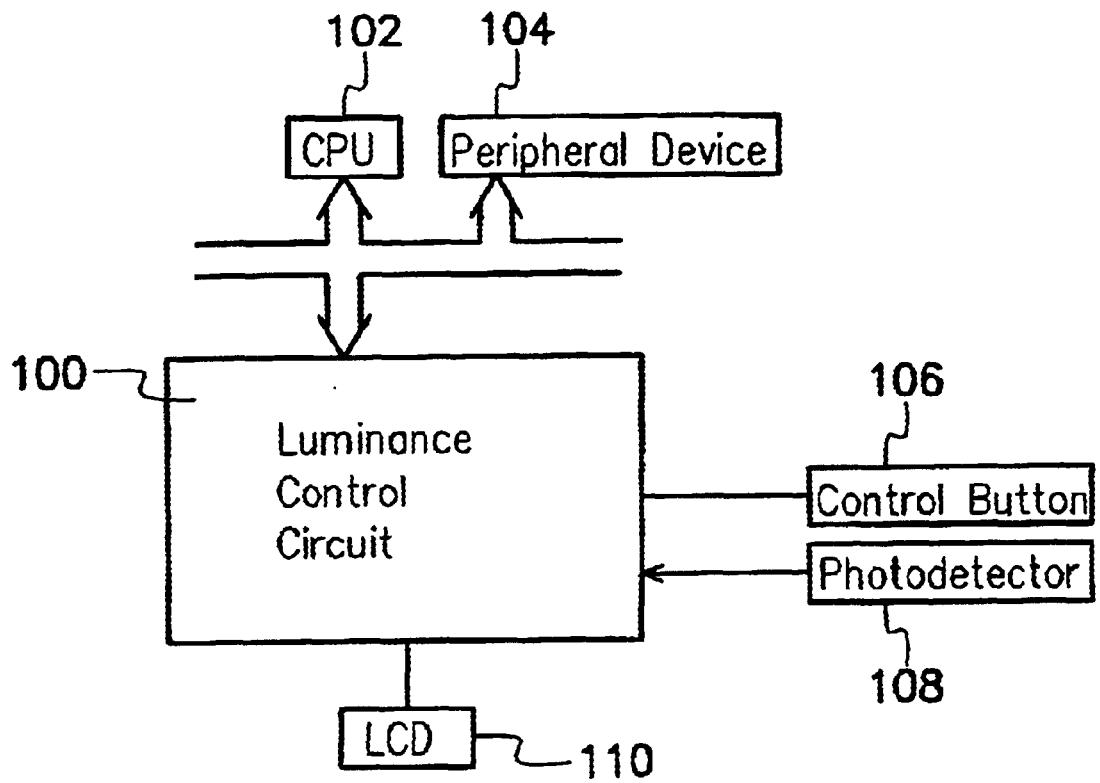
FIG. 1 is a diagram, schematically illustrating a conventional control system on a LCD displaying system.
Figure 2:
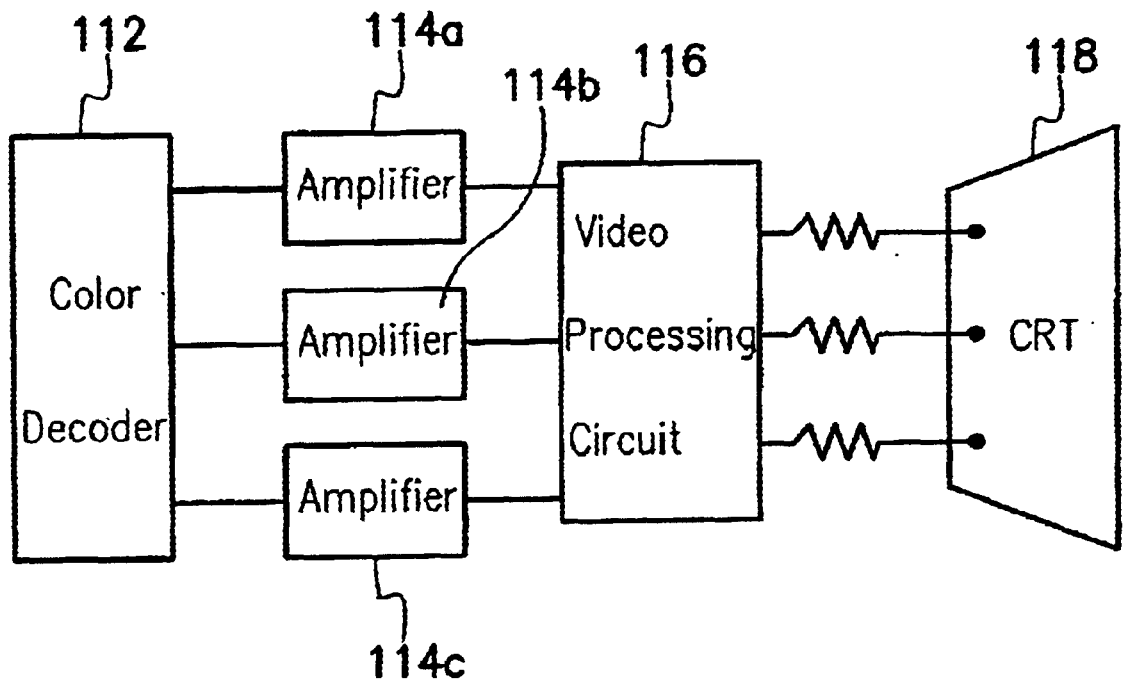
FIG. 2 is a drawing, schematically illustrating a color control system on a TV cathode-ray tube through a color temperature.
Figure 3:
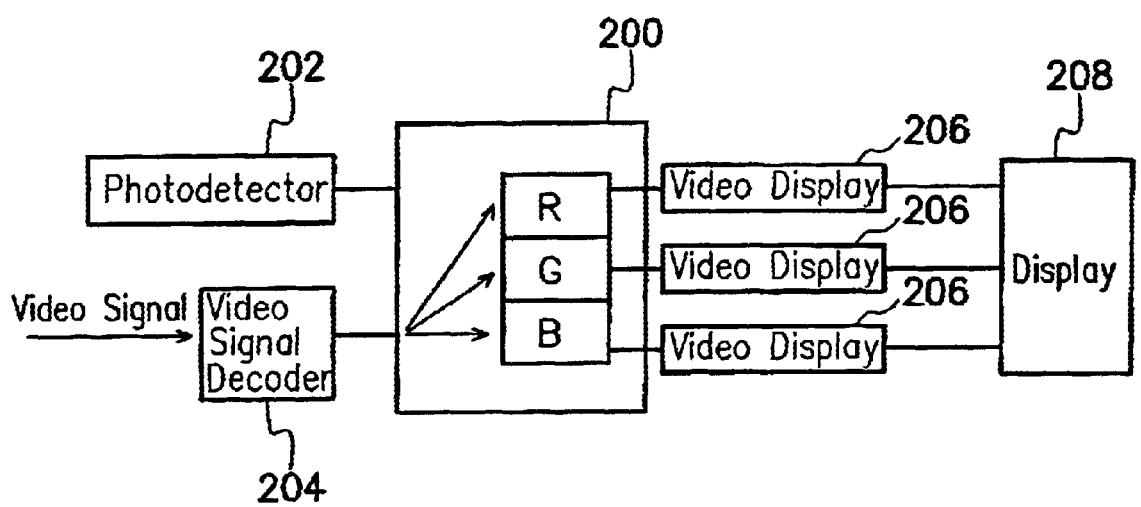
FIG. 3 is a drawing, schematically illustrating a vision system with a luminance correction device for an image, according to a preferred embodiment of the invention.

FIG. 3 is a drawing, schematically illustrating a vision system with a luminance correction device for an image, according to a preferred embodiment of the invention. In FIG. 3, the system includes a color correction circuit 200, a video signal decoder 204, a photodetector 202, and a display 208. The photodetector 202 is used to detect degree of the environment luminance, and can accordingly export a reference signal to the color correction circuit 200. The video signal decoder 204 is used to receive the video signal and to decode the video signal into three components of RGB, which are also exported to the video display 206.

Figure 4:
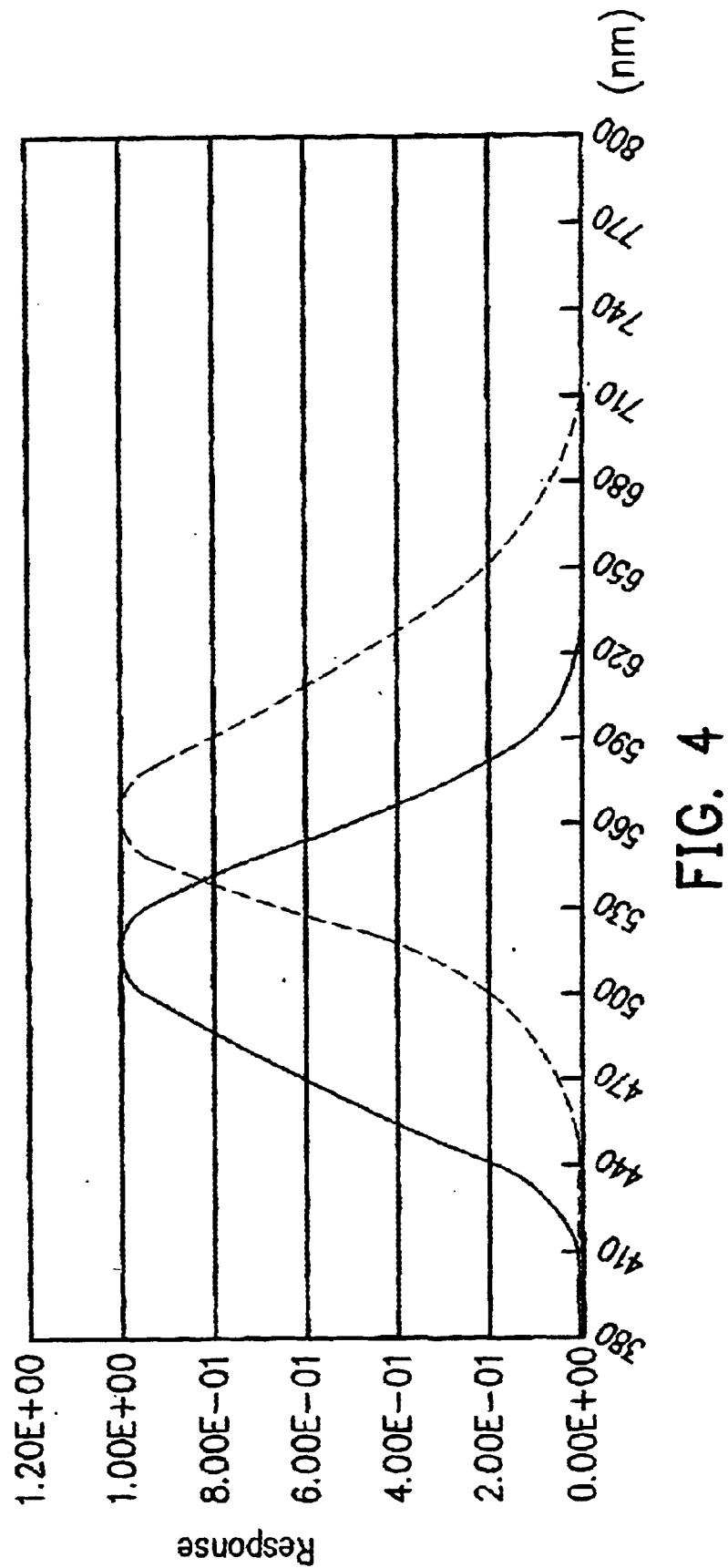
FIG. 4 is a drawing, illustrating vision response curves versus color light wavelength determined by organization of CIE.

For the operation of the system, it is described in the following in detail. The color correction circuit 200 includes, for example, a microprocessor and a memory in the hardware manner. In addition, a software can be also included and is executed by the color correction circuit 200. The color correction circuit 200 stores, for example, the vision response curve at bright condition (dashed line) and the vision response curve at dark condition (solid line), as shown in FIG. 4. When the correction circuit 200 receives the reference signal exported by the photodetector 202, it can judge whether the system is under the dark environment or under the bright environment. The judging method can be, for example, comparing the reference signal with a predetermined threshold level. The color correction circuit then, for example, choose one of the vision response curve at bright condition and the vision response curve at dark condition as the correcting vision response curve. In general, the correcting vision response curve can be chosen by interpolation between the vision response curve at bright condition and the vision response curve at dark condition, according to the degree of the environment luminance.

The color correction circuit 200 uses functions of the software and the correcting vision response curve to individually correct the three components of RGB, and then export the corrected video signal to the display 208 for display the image carried by the video signal. The color correction circuit 200 can also include some conventional circuit elements, such as signal inverters between digital and analogue state. The other parts of the actual circuit design to achieve the intended functions should be known by the skilled artisans, no further description is provided here.

The invention particularly employs a photodetector to detect the luminance of the current environment. According to the detected result, a proper vision response curve is chosen. The chosen vision response curve is used to accordingly and individually correct the luminance of the three components of RGB. Thereby, the image displayed on the screen can always stay at the optimized luminance of image. There is no need of adjustment by the user, who may also producing bias. The effect of eye's response for different colors is automatically considered in adjustment to the optimized condition. The bias of color due to personal feeling can be effectively avoided. The invention has the intelligent feature with functions to automatically correct the luminance contrast of color.

The invention of the color correction system not only can be used in a usual displaying appliance, but also can be used in a projecting displaying system, using the color correction system to correct the light intensity for the three color components.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A luminance correction system, comprising:
    a video signal decoder, used to receive a video signal, and decode the video signal into three components of red, green, and blue (ROB);
    a photodetector, used to detect an environment luminance, and accordingly export a reference signal; and
    a correction circuit, used to receive the reference signal of the photodetector, and receive the three components of RGB, wherein the correction circuit also store a vision response curve at dark condition and a vision response curve at bright condition, so that a correcting vision response curve is determined according to the reference signal, and the correction circuit individually corrects luminance of the three components of RGB and exports the three components of RGB.

2. The luminance correction system of claim 1, further comprising a display which receives the three components of RGB exported by the correction circuit.

3. The luminance correction system of claim 1, wherein the vision response curve at dark condition and the vision response curve at bright condition are provided by an organization of Commission Internationale De L'eclairage (CIE).

4. The luminance correction system of claim 1, wherein the correction circuit comprises a software which is executed for correcting the three components of RGB.

5. The luminance correction system of claim 1, wherein the correcting vision response curve determined by the correction circuit is the vision response curve at bright condition or the vision response curve at dark condition.

6. A projection system with luminance control device, comprising:

a video signal decoder, used to receive a video signal, and decode the video signal into three components of red, green, and blue (RGB);

a photodetector, used to detect an environment luminance, and accordingly export a reference signal; and a correction circuit, used to receive the reference signal of the photodetector, and receive the three components of RGB, wherein the correction circuit also store a vision response curve at dark condition and a vision response curve at bright condition, so that a correcting vision response curve is determined according to the reference signal, and the correction circuit individually and relatively corrects luminance of the three components of RGB and exports the three components of RGB.

7. The projection system with luminance control device of claim 6, further comprising an image projection device, which receives the three components of RGB exported by the correction circuit, forms a corrected video signal, and projects the corrected video signal onto a screen.

8. The projection system with luminance control device of claim 6, wherein the vision response curve at dark condition and the vision response curve at bright condition are provided by an organization of Commission Internationale De L'eclairage (CIE).

9. The projection system with luminance control device of claim 6, wherein the correction circuit comprises a software which is executed for correcting the three components of RGB.

10. The projection system with luminance control device of claim 6, wherein the correcting vision response curve determined by the correction circuit is the vision response curve at bright condition or the vision response curve at dark condition.

11. A method for adjusting an image luminance, comprising:

providing a video signal, having three components of red, green, and blue (RGB);

detecting an environment luminance, thereby to provide a reference signal;

providing a vision response curve at dark condition and a vision response curve at bright condition;

determining a correcting vision response curve, according to the reference signal, the vision response curve at dark condition, and the vision response curve at bright condition; and individually correcting the three components of RGB, using properties of the correcting vision response curve.

12. The method for adjusting an image luminance of claim 11, wherein further comprising a displaying device that receives the three components of RGB after correction to display an image of the video signal.

13. The method for adjusting an image luminance of claim 12, wherein the step of individually correcting the three components of RGB comprising using a control circuit and a software executed by the control circuit, so as to correct the three components of RGB.

14. The method for adjusting an image luminance of claim 11, wherein the vision response curve at dark condition and the vision response curve at bright condition are provided by an organization of Commission Internationale De L'eclairage (CIE).

15. The method for adjusting an image luminance of claim 11, wherein the correcting vision response curve is the vision response curve at bright condition or the vision response curve at dark condition.

\* \* \* \* \*